(12) United States Patent
Weng et al.

(10) Patent No.: US 12,110,111 B2
(45) Date of Patent: Oct. 8, 2024

(54) LUGGAGE COMPARTMENT, CABIN COMPONENT ASSEMBLY AND AIRCRAFT

(71) Applicant: Airbus Operations GmbH, Hamburg (DE)

(72) Inventors: Alexander Weng, Hamburg (DE); Marcel Herrmann, Hamburg (DE); Holger Warner, Hamburg (DE); Torben Schech, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/321,097

(22) Filed: May 22, 2023

(65) Prior Publication Data

US 2023/0382531 A1   Nov. 30, 2023

(30) Foreign Application Priority Data

May 24, 2022 (EP) .................................... 22175161

(51) Int. Cl.
B64D 11/00 (2006.01)
(52) U.S. Cl.
CPC .... B64D 11/003 (2013.01); *B64D 2011/0038* (2013.01)
(58) Field of Classification Search
CPC .......... B64D 11/003; B64D 2011/0038; B64D 11/0023; B64D 13/00; B64D 2013/003; B64C 1/10
See application file for complete search history.

(56) References Cited

U.S. PATENT DOCUMENTS

| | | | |
|---|---|---|---|
| 6,290,175 B1 | 9/2001 | Hart et al. | |
| 10,793,276 B2 | 10/2020 | Radacovici et al. | |
| 11,840,871 B2 * | 12/2023 | Schneider | E05C 3/008 |
| 2017/0283058 A1 | 10/2017 | Papke et al. | |
| 2019/0092473 A1 * | 3/2019 | Benthien | B60R 5/003 |
| 2023/0025168 A1 | 1/2023 | Weng et al. | |

FOREIGN PATENT DOCUMENTS

DE   102011116596 A1   4/2013
DE   102020109169 A1   10/2021

OTHER PUBLICATIONS

European Search Report for corresponding European Patent Application No. 22175161 dated Oct. 20, 2022; priority document.

* cited by examiner

*Primary Examiner* — Valentina Xavier
(74) *Attorney, Agent, or Firm* — Greer, Burns & Crain, Ltd.

(57) ABSTRACT

A luggage compartment, for use in a vehicle, having a housing with an inner volume defining a storage space of the luggage compartment and a flap which is attached to the housing with at least one fastening device. The fastening device has a first portion attached to the flap and a second portion, wherein the second portion of the fastening device is releasably coupled to the first portion of the fastening device and attached to an outer surface of a top wall of the housing. Also a cabin component assembly with the luggage compartment and a ceiling panel arranged adjacent to the top wall of the housing of the luggage compartment and an aircraft with the cabin component assembly.

14 Claims, 3 Drawing Sheets

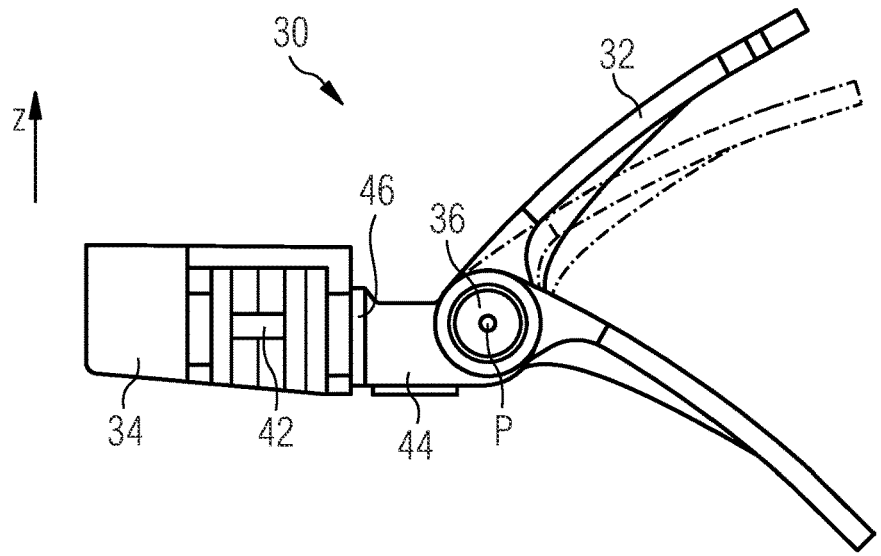
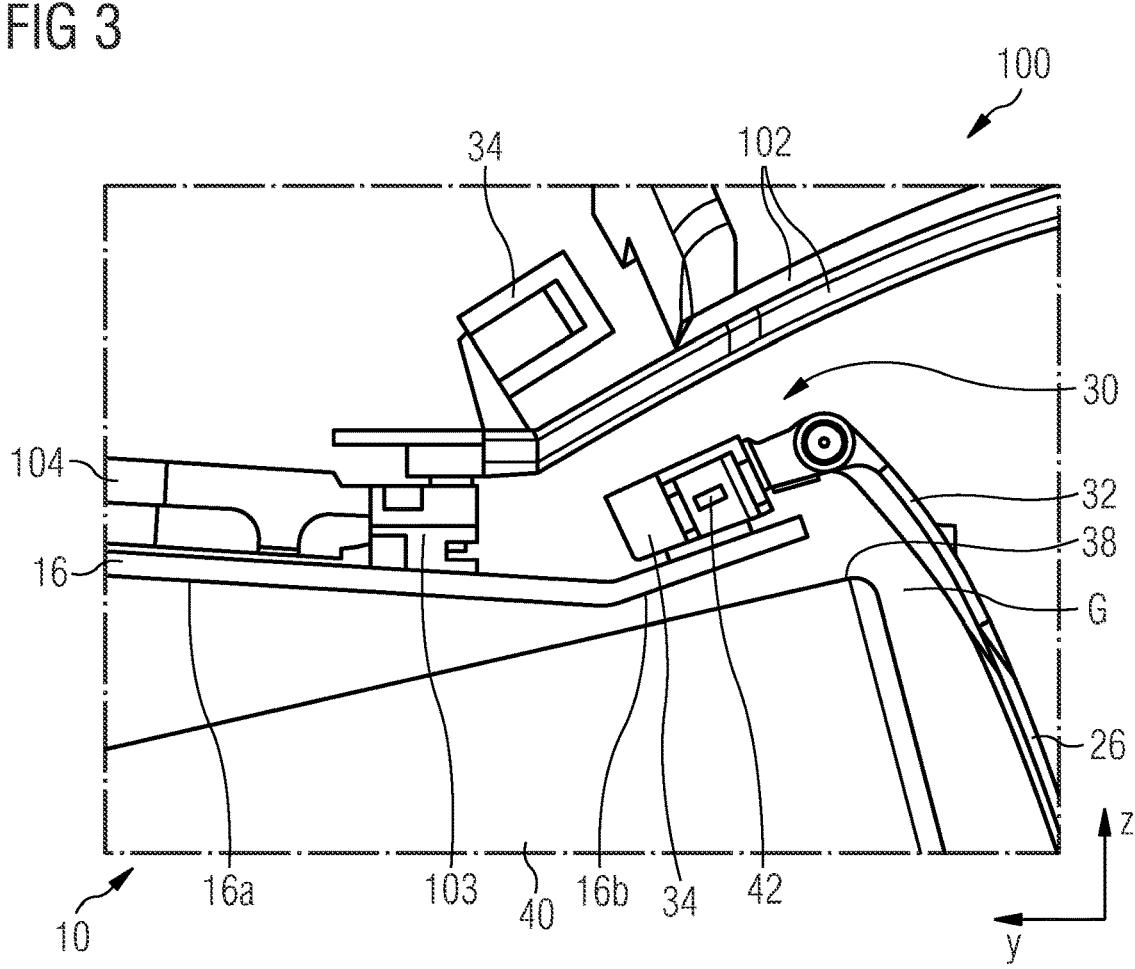

LUGGAGE COMPARTMENT, CABIN COMPONENT ASSEMBLY AND AIRCRAFT

RELATED APPLICATIONS

This application claims the benefit of European Patent Application No. 22175161.3 filed on May 24, 2022, the entire disclosure of which is incorporated herein by way of reference.

FIELD OF THE INVENTION

The present invention relates to a luggage compartment for use in a vehicle, in particular an aircraft, and a cabin component assembly comprising such a luggage compartment. Further, the invention relates to an aircraft equipped with a luggage compartment and/or a cabin component assembly.

BACKGROUND OF THE INVENTION

Passenger cabins of transport vehicles such as aircraft, buses or trains, are usually equipped with overhead luggage compartments which are installed above rows of passenger seats and which are used to stow hand luggage. In particular in aircraft cabins, there is a demand for more hand luggage storage space, since passengers tend to bring more and larger hand luggage on board the aircraft. Therefore, the cabins of new aircraft are equipped with larger overhead luggage compartments. In addition, the cabins of existing aircraft are retrofitted with larger overhead luggage compartments. In both cases, it is desirable, that ceiling panels arranged above the overhead luggage compartments can be dismounted, for example for maintenance work on components installed behind the ceiling panels, without having to uninstall also the luggage compartments.

A vehicle region with two luggage compartments with enlarged storage space below an overlapping ceiling panel is described in DE 10 2020 109 169 A1. The luggage compartments comprise a detachable luggage compartment flap and a luggage compartment top. A detachable fastening device rotatably fastens the luggage compartment flap on the luggage compartment. A front edge of the luggage compartment top is at a distance from an end point in an intermediate space above the luggage compartment, to which end point a side of a ceiling panel is movable, said distance being greater than or equal to a width of the ceiling panel.

For removing the ceiling panel, the detachable luggage compartment flap of at least one of the luggage compartments is removed and the ceiling panel is released from respective holding devices provided on the luggage compartments. Thereafter, the ceiling panel is moved, wherein a first side of the ceiling panel is arranged in a first intermediate space between a primary structure of the vehicle and a first one of the two luggage compartments. Then, a second side of the ceiling panel, which is opposite the first side, is lowered wherein the second side of the ceiling panel is guided past a front edge of a luggage compartment top of a second one of the two luggage compartments and is guided at least partially through a luggage space of the second luggage compartment. Finally, the ceiling panel is removed from the intermediate space.

The detachable luggage compartment flap is fastened to the luggage compartment top by means of quick-release fastening devices which comprise a first section attached to an inner surface of the luggage compartment top and a second section attached to an inner surface of the luggage compartment flap. A joint allows the luggage compartment flap to be rotatably fastened to the luggage compartment top. The first section is connected to the second section and the joint by means of a quick-release fastener which comprises a plug-in element arranged on the joint and a corresponding opening in the first section. Thus, the plug-in element can be pushed into the opening in the first section and can be fixed in a latched position by means of a latching tab. By bending up the latching tab, the plug-in element can be released and removed from the opening.

While the provision of quick-release fastening devices allows a simple and easy mounting and dismounting of the detachable luggage compartment flap, the quick-release fastening devices are relatively bulky. Thus, the fastening devices may hinder that the storage space defined by an inner volume of the luggage compartment can be used to a maximum extent.

SUMMARY OF THE INVENTION

The invention is directed at an objective of providing a luggage compartment for use in a vehicle, in particular an aircraft, which is equipped with a detachable luggage compartment flap and which, at the same time, allows the storage space defined by an inner volume of the luggage compartment to be used in a particularly efficient manner. Further, the invention is directed at an object of providing a cabin component assembly comprising such a luggage compartment and an aircraft equipped with such a luggage compartment and/or such a cabin component assembly.

These objectives are solved with a luggage compartment having the features of one or more embodiments described herein, a cabin component assembly having the features of one or more embodiments described herein, and an aircraft equipment having the features of one or more embodiments described herein.

A luggage compartment for use in a vehicle comprises a housing having an inner volume defining a storage space of the luggage compartment. Further, the luggage compartment is provided with a flap which is attached to the housing by means of at least one fastening device. The fastening device comprises a first portion which is attached to the flap and a second portion. The second portion of the fastening device is releasably coupled to the first portion of the fastening device.

Preferably, the flap is pivotable relative to the housing between a closed position, wherein the flap covers the storage space of the luggage compartment, and an open position, wherein the flap provides access to the storage space of the luggage compartment. The flap may be lockable in its closed position by a suitable locking mechanism. Further, the flap may be attached to the housing in such a manner that, when the luggage compartment is installed in the vehicle, the flap can be moved in its open position by pivoting the flap upwards relative to the housing.

The second portion of the fastening device is attached to an outer surface of a top wall of the housing. Preferably, the second portion is attached to the outer surface of an edge region of the top wall which is arranged adjacent to the flap. In the context of this disclosure, the expression "outer surface" relates to a surface of the top wall which faces away from the inner volume and hence the storage space of the luggage compartment. Due to its positioning on the outer surface of the top panel, the second portion of the fastening device does not occupy storage space in the interior of the housing. Instead, the entire inner volume of the housing may be used for storing luggage. This allows, for example, to place standard trolleys, in particular four standard trolleys, in an upright position in the storage space of the luggage compartment. In addition, loading and unloading of the luggage compartment is not affected by the fastening device which, on the one hand, simplifies usage of the luggage compartment and, on the other hand, protects the fastening device from damages caused by collisions with luggage, for example during loading and unloading of the luggage compartment.

At the same time, the fastening device allows the flap to be detached from the housing of the luggage compartment, for example, so as to allow mounting and dismounting of ceiling panels as described in DE 10 2020 109 169 A1. The luggage compartment therefore can be used for retrofitting a vehicle cabin while reusing the existing ceiling panels. Consequently, the costs for the retrofit can be significantly reduced.

The second portion of the fastening device may be pivotably coupled to the first portion of the fastening device. In particular, the fastening device may be provided with a joint which allows a pivoting movement of the first portion of the fastening device relative to the second portion of the fastening device about a pivot axis of the joint. The joint may be connected to or formed integral with the first portion of the fastening device.

Preferably the second portion of the fastening device is releasably coupled to the first portion of the fastening device by means of a quick-release fastener. The quick-release fastener may be a quick-release fastener which has a similar design as the quick-release fastener described in DE 10 2020 109 169 A1. Specifically, the quick-release fastener may comprise a plug-in element which is connected to or formed integral with the first portion of the fastening device and which is configured to be releasably accommodated in a receiving opening provided on the second portion. The plug-in element may comprise a latching tab configured to engage with a latching opening provided on the second portion in order to lock the first portion with the second portion of the fastening device. For unlocking the first portion from the second portion of the fastening device, the latching tab may be bent up so as to allow the plug-in element to be removed from the receiving opening of the second portion. The joint which is configured to allow the first portion of the fastening device to be pivoted relative to the second portion of the fastening device may be arranged between the plug-in element and the first portion of the fastening device.

As compared to the fastening device according to DE 10 2020 109 169 A1, the second portion of the fastening device used in the herein described luggage compartment may be unchanged. The first portion, however, needs to be adjusted by turning the first portion by 180° about an y-axis relative to the second portion, the joint and the plug-in element. Further, in dependence on the design of the top wall and the flap and in dependence on the exact positioning of the second portion on the outer surface of the top panel, it might be necessary to prolong the first portion. It should be understood, that a design of the fastening device which is similar to the design of the fastening device known from DE 10 2020 109 169 A1 is described herein as a preferred embodiment, since it allows to save costs for adapting the layout of the fastening device.

However, the present disclosure is, of course, not limited to this preferred embodiment of the fastening device fastening device. Instead, numerous design variations are conceivable. For example, the quick-release fastener may be modified so as to allow a simplified excess from a position in front of the luggage compartment. This may, for example be achieved by providing the quick-release fastener with a latching mechanism that is accessible on an outer side surface of the second portion of the fastening device which faces away from a central transverse y-axis of the luggage compartment.

A contour of a contact surface of the first portion of the fastening device which abuts against a corresponding contact surface of the flap preferably is adjusted to the contour of the contact surface of the flap. For example, the contact surface of the first portion of the fastening device may have a curvature which is adapted to a curvature of the corresponding contact surface of the flap. Similarly, a contour of a contact surface of the second portion of the fastening device which abuts against a corresponding contact surface of the top wall may be adapted to the contour of the contact surface of the top panel. Preferably, the contour of the contact surface of the top wall is substantially flat so that the contour of the abutting contact surface of the second portion of the fastening device preferably is also flat.

Basically, it is conceivable that the first portion of the fastening device is attached to an outer surface of the flap. However, preferably, the first portion of the fastening device is attached to an inner surface of the flap. In the context of this disclosure, the expression "inner surface" relates to a surface of the flap which faces the inner volume and hence the storage space of the luggage compartment. In particular, the first portion of the fastening device may at least in part be received in a recess provided in the inner surface of the flap. This allows a particularly space-saving and visually pleasing arrangement of the first portion of the fastening device.

The top wall of the housing may comprise a rear section facing a rear wall of the housing and a front section facing away from the rear wall of the housing. The front section may define an edge region of the top wall which is arranged adjacent to the flap. The front section may bent relative to the rear section in a direction facing away from the inner volume of the housing. When the luggage compartment is installed in a vehicle, for example in an aircraft, the front section of the top wall may be bent up upwards in a direction of a ceiling of the vehicle cabin. Preferably, the second portion of the fastening device is attached to an outer surface of the front section of the top panel.

By providing the top wall with a(n) (upwardly) bent front section, loading and unloading of the luggage compartment is simplified. However, on the other hand, installation space for components in a region above the luggage compartment and/or space for mounting and dismounting ceiling panels as described, for example, in DE 10 2020 109 169 A1, is reduced. In order to achieve a beneficial compromise between these opposing requirements, the front section of the top wall preferably is designed so as to extend substantially parallel to a bottom wall of the housing of the luggage compartment. Consequently, the front section of the top wall may extend substantially parallel to an upper surface of a standard trolley loaded into the luggage compartment.

The first portion of the fastening device and/or the flap preferably is/are shaped and dimensioned in such a manner that a gap exists between an inner surface of the flap and a flap facing edge of a standard trolley loaded into the luggage compartment. This may, for example, be achieved by suitably adapting the curvature of the first portion of the fastening device and/or the flap. Alternatively or additionally thereto, a dimension of the first portion of the fastening device in the direction parallel to a central transverse y-axis of the luggage compartment may be adapted in a suitable manner.

In a preferred embodiment of the luggage compartment, a maintenance interface of the fastening device is provided in a region of an outer side surface of the second portion of the fastening device which faces away from a central transverse y-axis of the luggage compartment. When the luggage compartment is installed in a vehicle, the central transverse y-axis of the luggage compartment typically extends parallel to a transverse axis of the vehicle. The maintenance interface may serve to allow access to the fastening device for maintenance work. For example, the maintenance interface may be designed for engagement with a tool so as to allow adjustment of a spring element biasing the flap into its open position so as to support an opening movement of the flap.

A cabin component assembly comprises a luggage compartment as described above and a ceiling panel which is arranged adjacent to the top wall of the housing of the luggage compartment. The ceiling panel and the luggage compartment may be arranged relative to each other in such a manner that the ceiling panel may be mounted and dismounted with the luggage compartment staying in place with only the detachable flap being removed as described in DE 10 2020 109 169 A1.

In a preferred embodiment of the cabin component assembly, a light gap is provided between the top wall and an edge of the flap which is arranged adjacent to the top panel. The light gap allows a passage of light emitted from a light source installed in a region of the ceiling panel when the flap is arranged in an open position so as to allow access to the storage space of the luggage compartment. Thus, the provision of an additional light source and/or a light reflection panel for illuminating the storage space of the luggage compartment when the flap is arranged in an open position can be dispensed with. Consequently, the luggage compartment can be a non-electric luggage compartment, i.e. a luggage compartment which is not equipped with electric components.

Preferably, the at least one fastening device, with respect to a longitudinal x-axis of the luggage compartment, is arranged offset to the light gap. In a preferred embodiment of the luggage compartment, the light gap does not extend along the entire length of the luggage compartment in the direction of its longitudinal x-axis. Instead, in edge regions of the luggage compartment along its longitudinal x-axis, no light gap is provided between the top wall and the edge of the flap which is arranged adjacent to the top panel. These edge regions thus may be used for placing the at least one fastening device without affecting the light transmitting function of the light gap.

The cabin component assembly may further comprise a ceiling air outlet arranged adjacent to the top panel. When the cabin component assembly is installed in a vehicle, the ceiling air outlet is arranged above the top wall and may be connected to air guiding tubes extending along the rear wall of the luggage compartment. Preferably, the at least one fastening device, with respect to the longitudinal x-axis of the luggage compartment, is arranged offset to an air outlet opening of the ceiling air outlet. In a preferred embodiment of the luggage compartment, the ceiling air outlet does not extend along the entire length of the luggage compartment in the direction of its longitudinal x-axis. Thus, edge regions of the luggage compartment along its longitudinal x-axis, which are not covered by the ceiling air outlet may be used for placing the at least one fastening device in a turbulent area of the airflow exiting the ceiling air outlet so as to reduce a ventilation loss by flow shadowing.

The cabin component assembly may further comprise a movable class divider which is configured to be moved in a direction parallel to the longitudinal x-axis of the luggage compartment and which serves to divide for example a business class section of a vehicle cabin from an economy class section of the vehicle cabin. The movable class divider may comprise a mounting device which is movably connected to the outer surface of the top wall and designed in such a manner that the mounting device is configured to travel in a free space existing between the fastening device and the ceiling panel when the movable class divider is moved relative to the luggage compartment and the ceiling panel in a direction parallel to the longitudinal x-axis of the luggage compartment. For example, the mounting device of the movable class divider may be connected to the rear section of the top wall and/or may be provided with a curved shape such that the mounting device spans the fastening device and thus can travel past the fastening device when the movable class divider is moved relative to the luggage compartment and the ceiling panel in a direction parallel to the longitudinal x-axis of the luggage compartment. The mounting and operation of a movable class divider in the above-described manner is particularly easy if the front section of the top wall is designed so as to extend substantially parallel to the bottom wall of the housing of the luggage compartment.

An aircraft is equipped with an above described luggage compartment and/or an above described cabin component assembly.

BRIEF DESCRIPTION OF THE DRAWINGS

Preferred embodiments of the invention will now be explained in greater detail with reference to the accompanying schematic drawings, in which

FIG. 2 shows detailed view of a fastening device for pivotably and detachably fastening a flap to a housing of the luggage compartment;

FIG. 3 shows a cabin component assembly comprising the luggage compartment of FIG. 1 and a ceiling panel, wherein the cabin component assembly is installed in a passenger cabin of an aircraft;

DETAILED DESCRIPTION OF THE PREFERRED EMBODIMENTS

Figure 1:
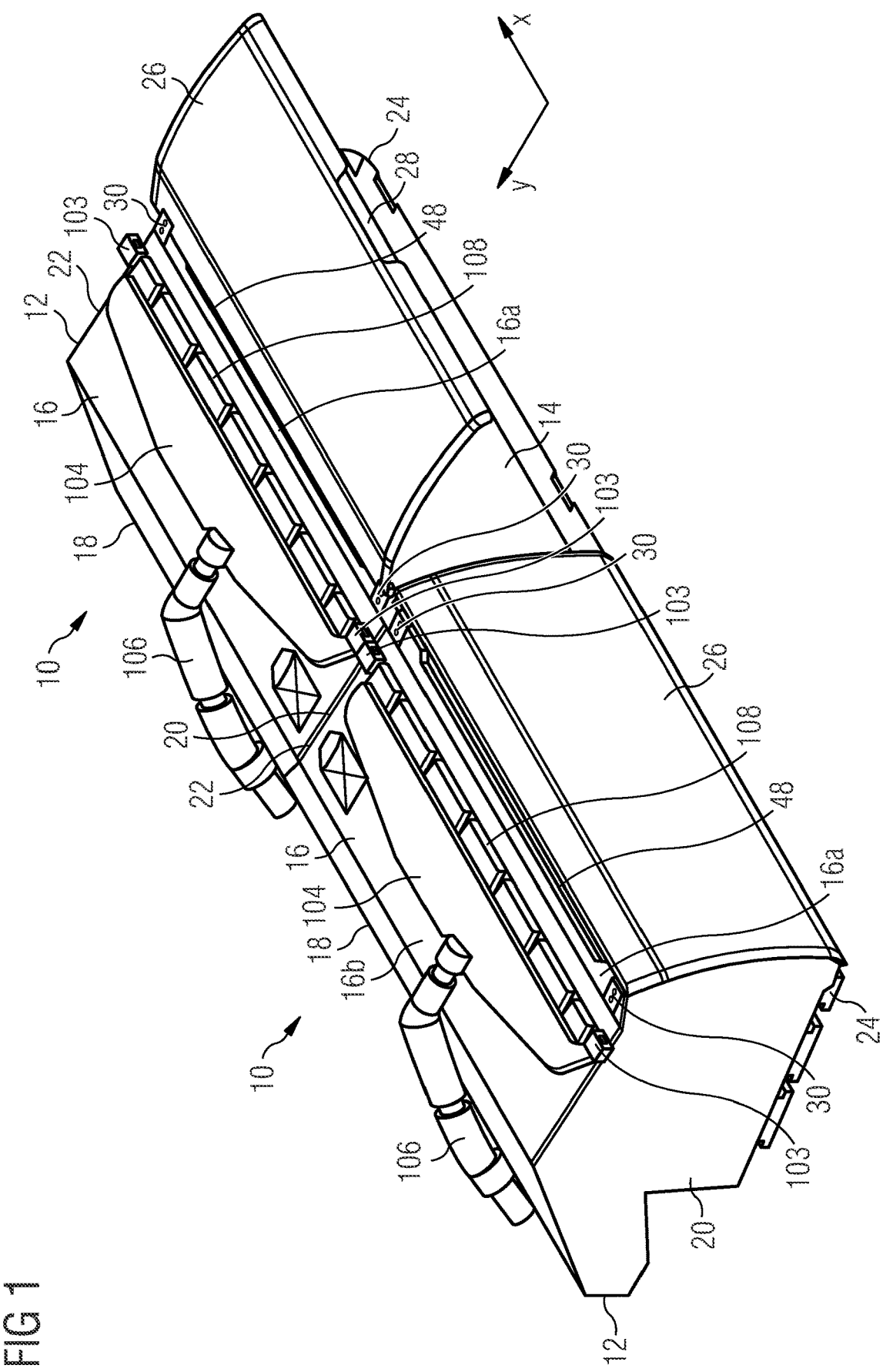
FIG. 1 shows a luggage compartment suitable for installation in an aircraft cabin.
Figure 4:
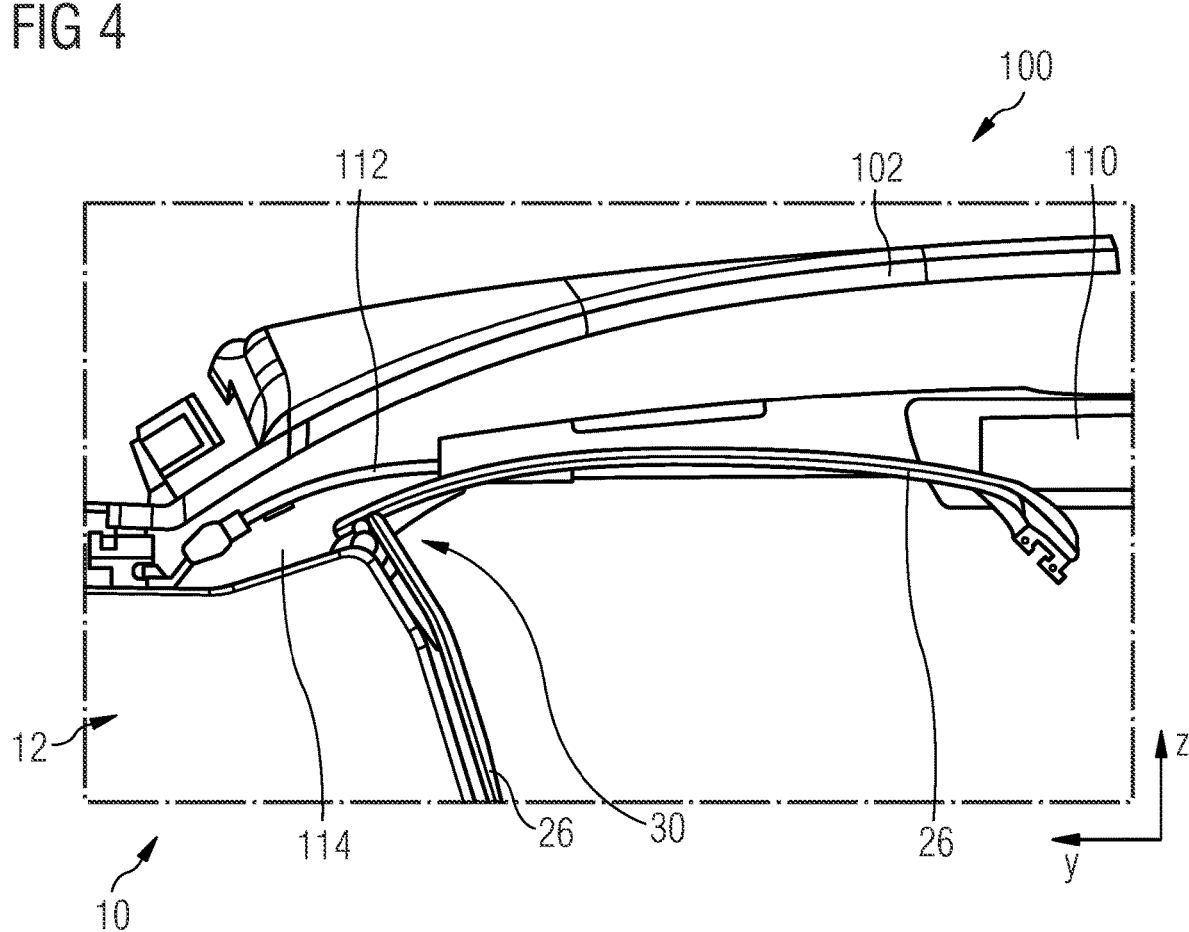
FIG. 4 shows a cabin component assembly comprising the luggage compartment of FIG. 1, a ceiling panel and a movable class divider, wherein the cabin component assembly is installed in a passenger cabin of an aircraft.
Figure 5:
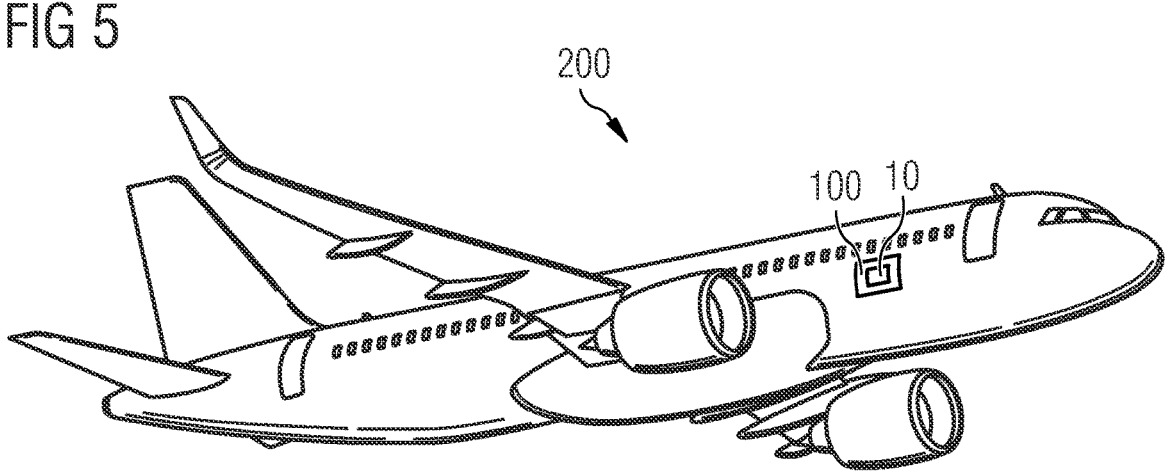
FIG. 5 shows an aircraft equipped with the luggage compartment of FIG. 1 and the cabin component assemblies of FIGS. 3 and 4.

FIG. 1 shows a luggage compartment 10 which is suitable for use as an overhead luggage compartment in a passenger cabin of an aircraft 200 as shown in FIG. 4. The luggage compartment 10 comprises a housing 12 having an inner volume defining a storage space 14 of the luggage compartment 10. The housing 12 comprises a top wall 16, a rear wall 18, opposing side walls 20, 22 and a bottom wall 24. Further, the luggage compartment 10 is provided with a flap 26 which is pivotably and detachably attached to the housing 12.

As shown in FIG. 1, which depicts two identical luggage compartments 10 arranged side-by-side, the flap 26 is pivotable relative to the housing 12 between a closed position (see luggage compartment 10 shown on the left in FIG. 1), wherein the flap 26 covers the storage space 14 of the luggage compartment 10, and an open position (see luggage compartment 10 shown on the right in FIG. 1), wherein the flap 26 provides access to the storage space 14 of the luggage compartment 10. The flap 26 is lockable in its closed position by a suitable locking mechanism which may be unlocked by operating a handle 28 provided in the region of a lower edge of the flap 26 which is arranged adjacent to the bottom wall 24 of the housing 12 when the flap 26 is its closed position.

The flap 26 is attached to the housing 12 by means of fastening devices 30 which allow the flap 26 to be moved in its open position by pivoting the flap 26 upwards relative to the housing 12. A spring element (not shown) may be provided which biases the flap 26 into its opening position so as to support the opening movement of the flap 26. As shown in the detailed views of FIGS. 2 and 3, each of the fastening devices 30 comprises a first portion 32 which is attached to the flap 26 and a second portion 34 which is pivotably and releasably coupled to the first portion 32. A joint 36, which in the herein described embodiment of the fastening device 30 is connected to the first portion 32 of the fastening device 30, allows a pivoting movement of the first portion 32 of the fastening device 30 relative to the second portion 34 of the fastening device 30 about a pivot axis P of the joint 36.

The first portion 32 of the fastening device 30 is attached to an inner surface of the flap 26 which faces the inner volume and hence of the storage space 14 of the luggage compartment 10. A contour, i.e. a curvature, of a contact surface of the first portion 32 which abuts against a corresponding contact surface of the flap 26 is adjusted to the contour, i.e. a curvature, of the contact surface of the flap 26 so as to ensure proper fixation of the first portion 32 to the flap 26 and a visually pleasing appearance of the luggage compartment 10. The first portion 32 of the fastening device 30 and the flap 26 are shaped and dimensioned in such a manner that a gap G exists between an inner surface of the flap 26 and a flap facing edge 38 of a standard trolley 40 loaded into the luggage compartment 10.

The second portion 34 of the fastening device 30 is attached to an outer surface of the top wall 16 of the housing 12. In order to allow proper attachment of the second portion 34 to the top wall 16, a contour of a contact surface of the second portion 34 which abuts against a corresponding contact surface of the top wall 16 is adapted to the, here flat, contour of the contact surface of the top wall 16. Thus, in the herein described fastening device 30, the contact surface of the second portion 34 has a flat contour.

As becomes apparent in particular from FIG. 3, the top wall 16 of the housing 12 comprises a rear section 16a facing the rear wall 18 of the housing 12 and a front section 16b facing away from the rear wall 18 of the housing 12. The front section 16b defines an edge region of the top wall 16 which is arranged adjacent to the flap 26 and to which the second portion 34 of the fastening device 30 is mounted. The front section 16b is bent relative to the rear section 16a in a direction facing away from the inner volume of the housing 12 such that, when the luggage compartment 10 is installed in a passenger cabin of the aircraft 200 as shown in FIG. 3, the front section 16b of the top wall 16 is bent up upwards in a direction of a ceiling of the aircraft cabin. In particular, the front section 16b of the top wall 16 is designed so as to extend substantially parallel (with +/−15, or 10 or 5 degrees) to the bottom wall 24 of the luggage compartment 10. Consequently, the front section 16b of the top wall 16 extends substantially parallel to an upper surface of a typically substantially square-shaped standard trolley 40 loaded into the luggage compartment 10.

A maintenance interface 42 of the fastening device 30 (only schematically indicated in FIG. 2) is provided in a region of an outer side surface of the second portion 34 of the fastening device 30 which faces away from a central transverse y-axis of the luggage compartment 10. The maintenance interface 42 is designed for engagement with a tool so as to allow adjustment of the spring element biasing the flap 26 into its open position.

The luggage compartment 10 forms a component of a cabin component assembly 100 which, beside the luggage compartment 10, further comprises a ceiling panel 102 which is arranged adjacent to the top wall 16 of the housing 12 of the luggage compartment 10. The ceiling panel 102 is attached to the top wall 16 of the housing 12 by means of ceiling panel brackets 103 (see FIG. 1). The luggage compartment 10 is a retrofit luggage compartment intended for installation in an existing aircraft passenger cabin, while reusing existing cabin equipment and in particular an existing ceiling panel 102 as far as possible. In particular, it should be possible for the ceiling panel 102 to be mounted and dismounted as described, for example, in DE 10 2020 109 169 A1, with the flap 26 being detached from the housing 12 of the luggage compartment 10, but with the housing 12 remaining in place.

In order to simplify detaching the flap 26 from the housing 12 of the luggage compartment 10, the second portion 34 of the fastening device 30 is releasably coupled to the first portion 32 of the fastening device 30 by means of a quick-release fastener which may have a similar design as the quick-release fastener described in DE 10 2020 109 169 A1. Specifically, the quick-release fastener comprises a plug-in element 44 which is connected to the first portion 32 of the fastening device 30 and which is configured to be releasably accommodated in a receiving opening 46 provided on the second portion 34. The plug-in element 44 comprises a latching tab (not shown) configured to engage with a latching opening (not shown) provided on the second portion 34 in order to lock the first portion 32 with the second portion 34 of the fastening device 30. The joint 36 is arranged between the plug-in element 44 and the first portion 32 of the fastening device 30.

As shown in FIG. 1, a light gap 48 is provided between the top wall 16 and an edge of the flap 26 which is arranged adjacent to the top wall 16. The light gap 48 allows a passage of light emitted from a light source (not shown) installed in a region of the ceiling panel 102 when the flap 26 is arranged in an open position so as to allow access to the storage space 14 of the luggage compartment 10. The light gap 48 does not extend along the entire length of the luggage compartment 10 in the direction of its longitudinal x-axis. Instead, in edge regions of the luggage compartment 10 along its longitudinal x-axis, no light gap is provided between the top wall 16 and the edge of the flap 26. The fastening devices 30, with respect to the longitudinal x-axis of the luggage compartment are arranged offset to the light gap 48. Thus, the fastening devices 30 do not affect the light transmitting function of the light gap 48.

The cabin component assembly 100 further comprises a ceiling air outlet 104 arranged adjacent to the top wall 16 and being connected to air guiding tubes 106 extending along the rear wall 18 of the luggage compartment 10. The fastening devices with respect to the longitudinal x-axis of the luggage compartment 10, are arranged offset to an air outlet opening 108 of the ceiling air outlet 104. The ceiling air outlet 104 does not extend along the entire length of the luggage compartment 10 in the direction of its longitudinal x-axis. Thus, edge regions of the luggage compartment 10 along its longitudinal x-axis, which are not covered by the ceiling air outlet 104 can be used for placing the fastening devices 30 substantially adjacent to the ceiling panel brackets 103 in a turbulent area of the airflow exiting the ceiling air outlet 104.

In the arrangement of FIG. 4, the cabin component assembly 100 further comprises a movable class divider 110 which is configured to be moved in a direction parallel to the longitudinal x-axis of the luggage compartment 10 and which serves to divide for example a business class section of a vehicle cabin from an economy class section of the passenger cabin. The movable class divider 110 comprises a mounting device 112 which is movably connected to the outer surface of the top wall 16 and designed in such a manner that the mounting device is configured to travel in a free space 114 existing between the fastening device 30 and the ceiling panel 102 when the movable class divider 110 is moved relative to the luggage compartment 10 and the ceiling panel 102 in a direction parallel to the longitudinal x-axis of the luggage compartment 10. In particular, the mounting device 112 of the movable class divider 110 is connected to the rear section 16a of the top wall 16 and is provided with a curved shape such that the mounting device 112 spans the fastening device 30 and thus can travel past the fastening device 30 when the movable class divider 110 is moved relative to the luggage compartment 10 and the ceiling panel 102 in a direction parallel to the longitudinal x-axis of the luggage compartment 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A luggage compartment for use in a vehicle, the luggage compartment comprising:
    a housing having an inner volume defining a storage space of the luggage compartment; and
    a flap attached to the housing with at least one fastening device,
    wherein the at least one fastening device comprises a first portion attached to the flap and a second portion,
    wherein the second portion of the at least one fastening device is releasably coupled to the first portion of the at least one fastening device and attached to an outer surface of a top wall of the housing.
2. The luggage compartment of claim 1, wherein the flap is pivotably attached to the housing, or wherein the second portion of the at least one fastening device is pivotably coupled to the first portion of the at least one fastening device, or both.
3. The luggage compartment of claim 1, wherein a contour of a contact surface of the first portion of the at least one fastening device which abuts against a corresponding contact surface of the flap is adjusted to the contour of the contact surface of the flap, or wherein a contour of a contact surface of the second portion of the at least one fastening device which abuts against a corresponding contact surface of the top wall is adapted to the contour of the contact surface of the top wall, or both.
4. The luggage compartment of claim 1, wherein the first portion of the at least one fastening device is attached to an inner surface of the flap.
5. The luggage compartment of claim 1, wherein the top wall of the housing comprises a rear section facing a rear wall of the housing and a front section facing away from the rear wall of the housing, wherein the front section is bent relative to the rear section in a direction facing away from the inner volume of the housing, and wherein the second portion of the fastening device is attached to an outer surface of the front section of the top wall.
6. The luggage compartment of claim 5, wherein the front section of the top wall is designed so as to extend substantially parallel to a bottom wall of the housing of the luggage compartment.
7. The luggage compartment of claim 1, wherein the first portion of the at least one fastening device, or the flap, or both is/are shaped and dimensioned in such a manner that a gap exists between an inner surface of the flap and a flap facing edge of a trolley loaded into the luggage compartment.
8. The luggage compartment of claim 1, wherein a maintenance interface of the at least one fastening device is provided in an outer side surface of the second portion of the at least one fastening device which faces away from a central transverse y-axis of the luggage compartment.
9. A cabin component assembly comprising:
    the luggage compartment of claim 1; and
    a ceiling panel which is arranged adjacent to the top wall of the housing of the luggage compartment.
10. The cabin component assembly of claim 9, wherein a light gap is provided between the top wall and an edge of the flap and which is arranged adjacent to the top wall, the light gap allowing a passage of light emitted from a light source installed in the ceiling panel when the flap is arranged in an open position so as to allow access to the storage space of the luggage compartment.
11. The cabin component assembly of claim 10, wherein the at least one fastening device, with respect to a longitudinal x-axis of the luggage compartment, is arranged offset to the light gap.
12. The cabin component assembly of claim 9, further comprising:
    a ceiling air outlet arranged adjacent to the top wall, wherein the at least one fastening device, with respect to a longitudinal x-axis of the luggage compartment, is arranged offset to an air outlet opening of the ceiling air outlet.
13. The cabin component assembly of claim 9, further comprising:
    a movable class divider, wherein a mounting device of the movable class divider is movably connected to the outer surface of the top wall and designed in such a manner that the mounting device is configured to travel in a free space existing between the at least one fastening device and the ceiling panel when the movable class divider is moved relative to the luggage compartment and the ceiling panel in a direction parallel to a longitudinal x-axis of the luggage compartment.

14. An aircraft comprising:
the cabin component assembly of claim 9.

* * * * *